(12) United States Patent
Annis et al.

(10) Patent No.: US 10,317,289 B2
(45) Date of Patent: Jun. 11, 2019

(54) THERMAL WELL FOR TRANSFORMER AND METHODS

(71) Applicant: Rockwell Automation Technologies, Inc., Mayfield Heights, OH (US)

(72) Inventors: Jeffrey R. Annis, Wakesha, WI (US); Gary L. Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 194 days.

(21) Appl. No.: 14/710,000

(22) Filed: May 12, 2015

(65) Prior Publication Data

US 2016/0069750 A1 Mar. 10, 2016

Related U.S. Application Data

(60) Provisional application No. 62/048,436, filed on Sep. 10, 2014.

(51) Int. Cl.
*H01F 27/40* (2006.01)
*G01K 7/00* (2006.01)
(Continued)

(52) U.S. Cl.
CPC .............. *G01K 7/00* (2013.01); *G01K 1/08* (2013.01); *G01K 13/00* (2013.01); *H01F 27/402* (2013.01); *H01F 2027/406* (2013.01)

(58) Field of Classification Search
CPC .................................. H01F 5/00; H01F 27/28
(Continued)

(56) References Cited

U.S. PATENT DOCUMENTS 2,934,628 A 4/1960 Massar et al.
3,519,972 A 7/1970 Merrill
(Continued)

FOREIGN PATENT DOCUMENTS

CN 103398795 A * 11/2013
EP 0 580 323 A2 1/1994
(Continued)

OTHER PUBLICATIONS

Model F Series, Portage Electric Products, Inc., Product Literature, 2006, 1 pg.
(Continued)

*Primary Examiner* — Tszfung J Chan
(74) *Attorney, Agent, or Firm* — Fay Sharpe LLP

(57) ABSTRACT

A thermal well temperature monitoring assembly with high dielectric strength capability is disclosed consisting of a low relative dielectric constant material in a continuous structure that does not have any air voids or pockets. The low relative dielectric constant structure of the thermal well has at least one internal cavity having an end region. A thermal sensor is at least partially located within the at least one internal cavity. The thermal sensor has one or more wires extending out of the end region of the internal cavity. A first low relative dielectric constant potting material encapsulates at least a portion of the thermal sensor within the internal cavity to remove air voids that decrease dielectric strength. A second low relative dielectric constant potting material fills at least a portion of the end region of the internal cavity to provide mechanical ruggedness and environmental sealing.

20 Claims, 7 Drawing Sheets

(51) Int. Cl.
*G01K 13/00* (2006.01)
*G01K 1/08* (2006.01)

(58) Field of Classification Search
USPC .................................. 336/200, 221, 222
See application file for complete search history.

(56) References Cited

U.S. PATENT DOCUMENTS

| | | | |
|---|---|---|---|
| 3,944,960 A | 3/1976 | Audette et al. | |
| 4,665,307 A | 5/1987 | McWilliams | |
| 4,751,488 A | 6/1988 | Lanoue et al. | |
| 5,167,154 A * | 12/1992 | Lee | G01F 23/22 73/295 |
| 6,008,555 A | 12/1999 | Garr et al. | |
| 6,653,925 B1 | 11/2003 | Asami et al. | |
| 7,060,949 B1 * | 6/2006 | Davis | G01K 7/22 219/536 |
| 7,855,632 B1 * | 12/2010 | Schuh | G01K 1/08 338/28 |
| 9,151,484 B1 * | 10/2015 | Olsson | F21V 31/00 |
| 9,354,158 B1 * | 5/2016 | van Dijk | G01N 19/10 |
| 2004/0145437 A1 * | 7/2004 | Lee | H01F 27/402 336/55 |
| 2008/0080592 A1 * | 4/2008 | Houben | G01K 1/08 374/185 |
| 2012/0057617 A1 * | 3/2012 | Bohl | G01D 11/245 374/208 |
| 2013/0128919 A1 | 5/2013 | Austen et al. | |
| 2014/0034286 A1 * | 2/2014 | Sarver | F28F 27/00 165/287 |
| 2014/0257130 A1 * | 9/2014 | Cao | A61B 18/1492 606/41 |

FOREIGN PATENT DOCUMENTS

| | | | |
|---|---|---|---|
| JP | 02114933 A | * | 4/1990 |
| JP | 03062701 A | * | 3/1991 |
| JP | 06249716 A | * | 9/1994 |
| JP | 2000131150 A | * | 5/2000 |
| WO | WO 2010/108961 A1 | | 9/2010 |

OTHER PUBLICATIONS

Extended European Search Report dated Jan. 15, 2016 for European Application No. 15183691.3.
Burns Engineering, Frequently Asked Questions, FAQ's <https://web.archive.org/web/20100504162325/http://www.burnsengineering.com/faq> (May 5, 2010).

* cited by examiner

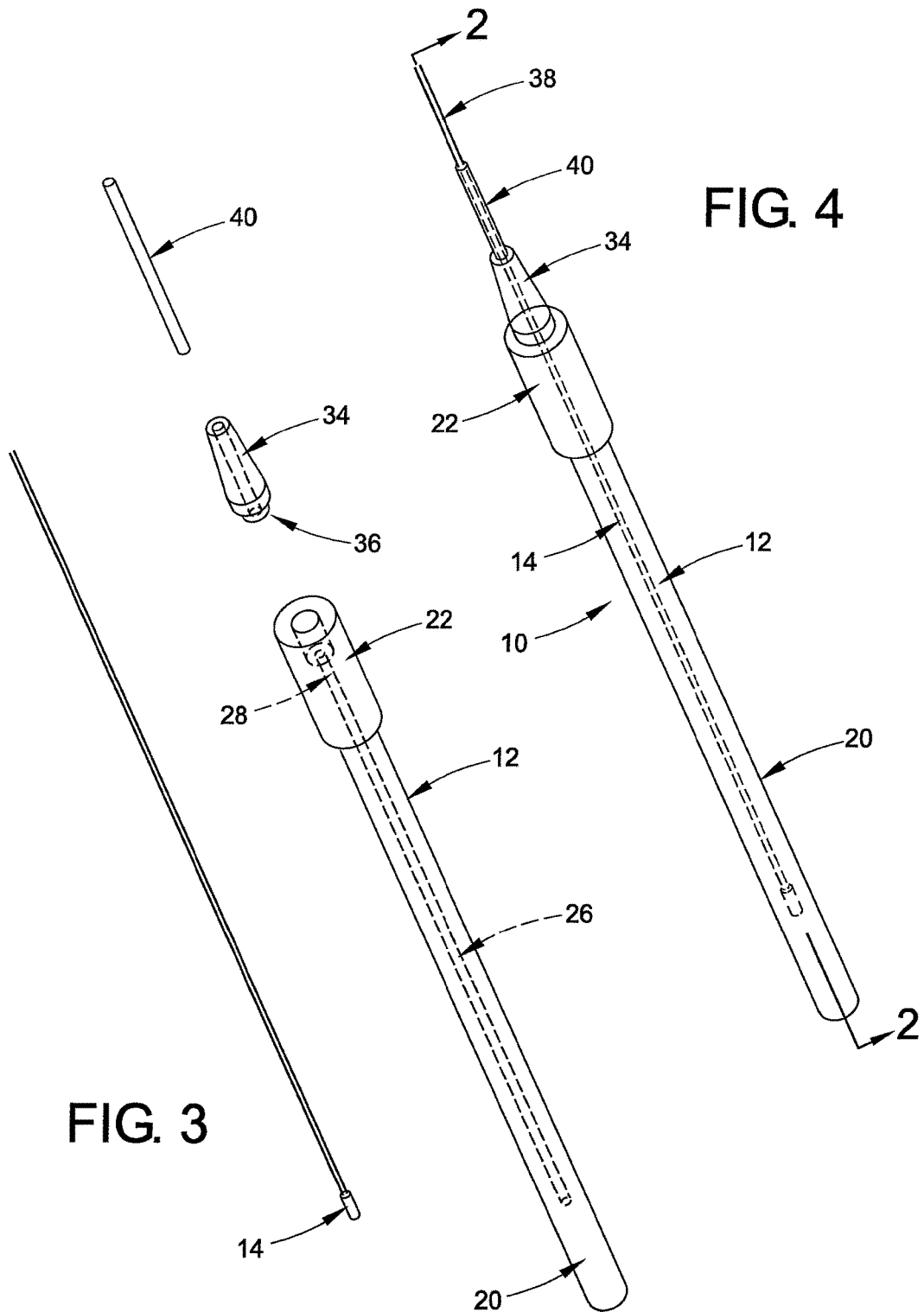

THERMAL WELL FOR TRANSFORMER AND METHODS

CROSS-REFERENCE TO RELATED APPLICATIONS

The instant application claims priority to U.S. Provisional Application Ser. No. 62/048,436, filed Sep. 10, 2014, the subject matter of which is incorporated herein by reference in its entirety.

BACKGROUND

The subject matter disclosed herein relates to temperature monitoring, and more specifically to temperature monitoring in transformers, especially those containing high voltage windings.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides a thermal well with a thermal sensor within a cavity of a low dielectric constant structure that monitors a temperature of an apparatus (for example, one or more coils of a transformer apparatus) and provides a signal that can be used to inhibit operation of the apparatus when the temperature thereof exceeds a predefined threshold temperature. In further aspects, the thermal well includes one or more potting layers to remove air voids within the thermal well assembly, thereby reducing the amount of corona build-up thereon. Even minute air voids will reduce the overall dielectric withstand voltage of the entire assembly due to the air voids becoming voltage stress concentrators and exceeding the corona inception voltage of air according to Paschen's law. Continuous operation with corona discharges in the air void can lead to insulation erosion and eventual voltage breakdown well before expected insulation end of life.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 3 is a disassembled view of the thermal well;

FIG. 4 is an assembled view of the thermal well;

DETAILED DESCRIPTION

Figure 1:
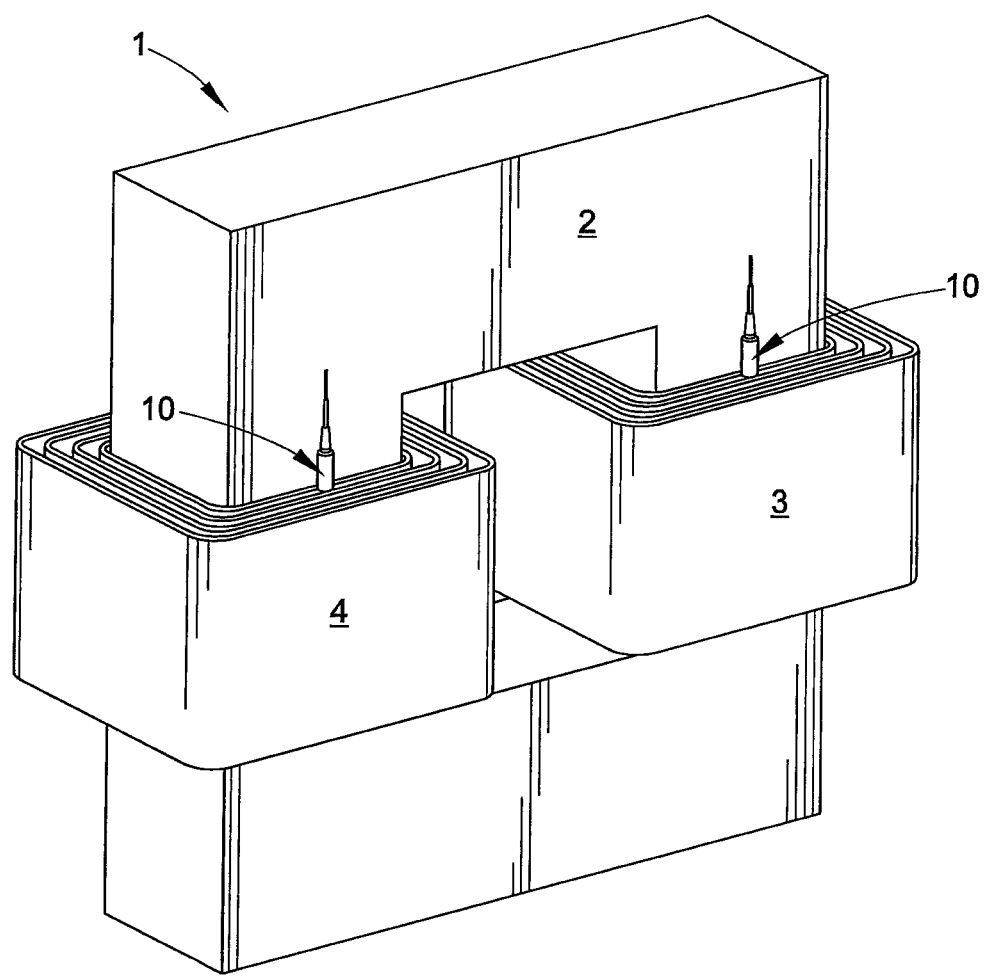
FIG. 1 is a perspective view of the thermal well assembly mounted between transformer coils.

Various embodiments are hereinafter illustrated and described, wherein the disclosure is not limited to the specific examples shown and described. A temperature monitoring apparatus or thermal well and methods are presented in which a thermal well includes a thermal sensor and one or more low relative dielectric constant potting layers within a low relative dielectric constant structure to mitigate or avoid air gaps in the thermal well. The low dielectric constant structure and potting layers in certain embodiments advantageously mitigate the potential for arcing and build-up of undesirable corona once positioned between high potential transformer coils or windings or in other high voltage or explosive environments.

Transformers are used for power generation and distribution, often for high energy applications (e.g., oil drilling, natural gas drilling, electricity generation, motor drives, and the like). In use, the transformer primary and secondary coils conduct current and are often at high voltage potentials, and the transformer core and/or windings typically heat up in operation due to current conduction. Moreover, undesirable currents in excess of expected design levels can cause the transformer coil temperatures to rise significantly. In order to monitor the status of the transformer and any downstream equipment with respect to over current conditions or other operational degradation, a thermal well or thermal sensor probe can be installed between adjacent transformer coils provide a signal representing the temperature of the transformer. In practice, knowing the transformer temperature can facilitate proactive identification of potential thermal stress or other component degradation in an electrical system. Some thermal probes use an insulating material (such as tape or a gel) or rolled multiple layers of an insulating material disposed between the thermal sensor and the coils, for example with a tape wrapped around a thermocouple. In use, the thermal well signal can be provided to a control system to monitor the temperature of the coils, and the sensed transformer temperature can be compared with a threshold temperature with the system selectively performing one or more remedial actions if the sensed operating temperature exceeds the threshold. A thermal switch may be used in the sensor probe, providing a signal state change upon the temperature reaching a predetermined level, with a connected controller performing a selected action in response (e.g., shut down, generate an alarm, and the like).

When the thermal well is positioned between the coils, pockets of air are often formed therebetween and/or between adjacent layers of wrapped insulation tape or rolled insulating layers. A high voltage potential between a transformer coil and a thermocouple or other thermal sensor, however, can make the thermal well susceptible to arcing conditions and corona build-up between the thermal well and the coils. Such arcing and corona can lead to degradation of insulating layers or failure of the thermal sensor, and further temperature monitoring would require repair or replacement which can be costly and labor-intensive in certain applications.

Referring initially to FIGS. 1-5, the present disclosure accordingly provides thermal well apparatus 10 which employs a low dielectric constant material structure 12 to house a thermal sensor 14 and thus inhibit arcing and/or corona conditions, and various embodiments further mitigate the presence of air between the thermal sensor and an outside surface of a thermal well by potting the cavity housing the thermal sensor using low relative dielectric constant potting material 16, 18. This novel thermal well apparatus can be advantageously employed for sensing temperature conditions in transformer structures or other environments involving high voltage potentials and/or explosive ambient conditions while reducing the risk of arcing or corona-based sensor failure or degradation.

FIG. 1 illustrates a top view of thermal well 10 installed in a transformer apparatus 1. The transformer apparatus 1 can be any suitable known transformer apparatus (e.g., single or three-phase transformers for power generation or distribution, motor drive applications, etc. Moreover, the disclosed thermal well designs 10 can be employed in other situations or applications in which it is desirable to measure a temperature, including without limitation oil drilling, natural gas drilling, and the like). In the example of FIG. 1, the transformer 1 includes a magnetic iron core structure 2, at least one primary coil 3 wound at least partially around the core structure 2, and at least one secondary coil 4 wound at least partially around the core structure 2. The transformer 1 can also include other necessary structures (not shown) and can be included in a machine our system (e.g., a motor drive with one or more power conversion stages and associated controllers, and the like). In some instances, a thermal well 10 is positioned proximate one of the primary coil 3 and the secondary coil 4, or thermal wells 10 can be divided proximate each of the coils 3, 4. For example, as shown in FIG. 1, the thermal well 10 is positioned proximate the primary coil 3 and another thermal well 10 is located near the secondary coil 4. In addition, in certain applications, the thermal well 10 can be positioned between adjacent coils or windings of the primary coil 3 and/or of the secondary coil 4. In this regard, a thermal well 10 can be positioned in any suitable position on, in or near the transformer 1 (e.g., on the primary coil 3, on the secondary coil 4, on the core structure 2, and the like), and any number of thermal wells 10 can be installed on or in various embodiments of a transformer apparatus 1 or other host system. In one example, the length of the thermal well assembly 10 is adjusted so that the tip of the thermal sensor 14 resides in the vertical center length of coil 3 or 4, since this is where the hottest temperature of the coil typically occurs.

The thermal well 10, moreover, can include any suitable thermal sensor (e.g., a thermocouple, a thermal switch, a resistive temperature device (RTD, whether negative temperature coefficient NTC or positive temperature coefficient PTC), and the like). Advantageously, the thermal well 10 provides a signal representing the host system temperature or transition of such host system temperature passed a predetermined threshold, which in practice can be used by a control system to inhibit operation of the transformer apparatus 1 when the transformer apparatus 1 exceeds a temperature threshold. Advantageously, the disclosed thermal well 10 in certain embodiments has no air gaps, thereby preventing or inhibiting unwanted build-up of corona on the thermal well 10 and mitigating the possibility of such conditions proximate the primary and/or secondary coils 3 and 4.

FIGS. 2-5 illustrate an example embodiment of the thermal well 10. As shown in FIGS. 2-5, the thermal well 10 includes a low relative dielectric constant structure 12, a thermal sensor 14, a first low relative dielectric constant potting material 16, and a second low relative dielectric constant potting material 18. The thermal well 10 in one embodiment has a generally round shape or outer profile in other embodiments (although any desired shape is possible, such as rectangular), where the round outer surface in certain embodiments advantageously conforms to or easily fits into a corresponding opening (not shown) between adjacent coils 3, 4 of the transformer apparatus 1. Conformance of the outer shape of the structure 12 to the host system advantageously increases the insulation thickness between the coil 3, 4 and the thermal sensor 14, thereby reducing the likelihood of arcing and/or corona formation. In other embodiments, cylindrical or other outer structure profiles can be used, for example, to enhance cost-effective manufacturability of the structure 12 and the overall thermal well apparatus 10.

The low relative dielectric constant structure 12 in certain embodiments can be made from any suitable non-chemically reactive material. In some examples, the low relative dielectric constant structure 12 is made from Teflon that has a dielectric constant of approximately 2.1. The low relative dielectric constant structure 12 also is a continuous structure that does not have any air voids or pockets. Advantageously, in some examples, making the structure 12 out of extruded or molded Teflon rod with this dielectric constant and which has a continuous structure: (1) reduces or eliminates air void where corona can develop; (2) absorbs a larger voltage potential between the adjacent coils 3 or 4; (3) centers the thermal sensor 14 between adjacent transformer coils in certain implementations thereby further reducing voltage stress levels; (4) provides good dielectric strength (5) is a good thermal conductor of heat from adjacent coil windings to the thermal sensor (6) has high temperature material characteristics @ 200 degree C. so that it can be used in Underwriters Lab (UL) recognized 180 degree C. insulation systems commonly used in transformer design and (7) provides a sealed thermal well enclosure reducing the chance of humidity, condensation and pollutants from degrading the assembly dielectric strength. Moreover, Teflon advantageously provides for cost-effective manufacturing of a thermal well apparatus 10, whether by machining or other fabrication techniques. Other suitable low relative dielectric constant material 12 can be used, wherein the illustrated Teflon embodiments are non-limiting. The low relative dielectric constant structure 12 can have any suitable dimensions. In one example, the structure 12 has a length of approximately 20.5" for housing a thermocouple or thermal switch in a gap between adjacent primary or secondary coils of a medium voltage or high-voltage transformer apparatus 1, although other dimensions can be used for a given end-use application. The low relative dielectric constant structure 12 has a rigid configuration for placement between the coils 3 and 4 and supporting the thermal sensor 14 and any include first potting material 16 and second potting material 18.

As shown in the embodiment of FIGS. 2-5, the low relative dielectric constant structure 12 includes a first portion 20 and a second portion 22. The first portion 20 has a generally rectangular shape (although other shapes are possible, such as cylindrical) and a first outer dimension $D_1$. The first portion 20 can have any suitable dimensions. For example, the first portion 20 has a length of approximately 18.0" and an outer width of approximately ⅝" in the illustrated embodiment, where the width of the first portion 20 in a rectangular configuration can correspond to the first outer dimension $D_1$. The second portion 22 in this embodiment also has a generally rectangular shape and a second outer dimension $D_2$ that is greater than the first outer dimension $D_1$. The second portion 22 can have any suitable dimensions in various embodiments. In the illustrated example, the second portion 22 has a length of approximately 2.5" and a width of approximately 1.0". For example, the width of the second portion 20 can correspond to the second outer dimension $D_2$. The second portion 22 is positioned proximate the first portion 20 such that the low relative dielectric constant structure 12 has a substantially T-shaped configuration to provide at least one abutment surface 24 allowing the apparatus 10 to be easily installed with the first portion 20 disposed between adjacent transformer coils in the second portion 22 above the coils with the abutment surface(s) 24 resting on the upper ends of the coil for repeatable location of the enclosed thermal sensor 14 at a predetermined location between transformer coils 3, 4. It will be appreciated that the low relative dielectric constant structure 12 can have any suitable configuration, so long as the second portion 22 is positioned proximate the first portion 20. In this embodiment, the abutment surfaces 24 are created by the second outer dimension $D_2$ being greater than the first outer dimension $D_1$, although other abutments can be used even if the second portion 22 does not have a larger outer dimension than does the first portion 20. Advantageously, the abutment surfaces 24 allow the thermal well 10 to contact a portion of the transformer apparatus 1 (i.e., the primary or secondary coils 3 or 4) to be securely positioned on the transformer apparatus 1.

Figure 2:
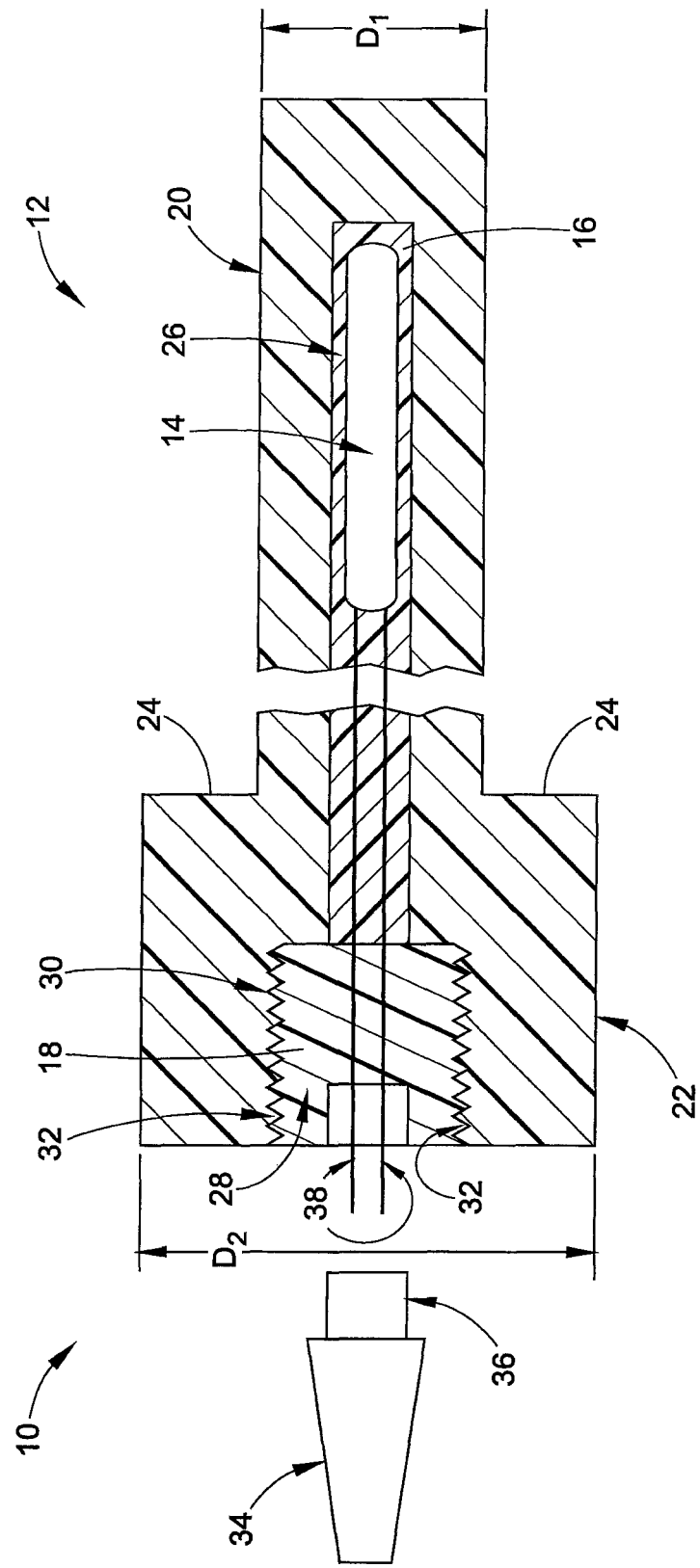
FIG. 2 is a sectional side elevation view taken along Line 2-2 in FIG. 4.

In some instances, the low relative dielectric constant structure 12 includes at least one internal cavity 26 configured to receive the thermocouple, thermal switch, RTD or other thermal sensor 14, and the cavity 26 also accommodates the first potting material 16, and the second potting material 18. As shown in FIGS. 2 and 3, the internal cavity 26 extends through the second portion 22 of the low relative dielectric constant structure 12 and into the first portion 20 thereof to any suitable depth to facilitate repeatable location of the thermal sensor 14 relative to the outlying transformer coils 3, 4. The internal cavity 26 in this non-limiting embodiment has a length of approximately 9.25" and a width of approximately 0.098". In one example, the length of internal cavity 26 is determined so that the thermal sensor 14 is approximately in the center of winding 3 and winding 4 in FIG. 1 for the most accurate hot spot coil temperature measurement. The internal cavity 26, moreover, advantageously is centered on the first and second portions 20 and 22 in order to facilitate centering of the enclosed thermal sensor 14 in the gap between adjacent transformer coils 3, 4 and thereby mitigate voltage stress on the sensor 14 in use. However, it will be appreciated that the internal cavity 26 in other embodiments can be offset relative to the axial center of the first and second portions 20 and 22.

The internal cavity 26 includes an end region 28 located on the second portion 22 of the low relative dielectric constant structure 12. As shown in FIG. 2, the end region 28 is spaced from the first portion 20; however, it will be appreciated that the end region 28 can extend into the first portion 20 in other embodiments in this example. The end region 28 has a length of approximately 1.25" and a width of approximately 0.196". In this regard, the end region 28 is twice as wide as the internal cavity 26, although not a strict requirement of all embodiments. In some examples, the end region 28 includes at least one internal side wall 30 with optional threads 32 disposed on at least a portion thereof. The threads 32 in this embodiment are configured to engage a strain relief member 34 that includes corresponding complementary threads 36, as described in more detail below. In other implementations, the threads 32 can be omitted.

Figure 5:
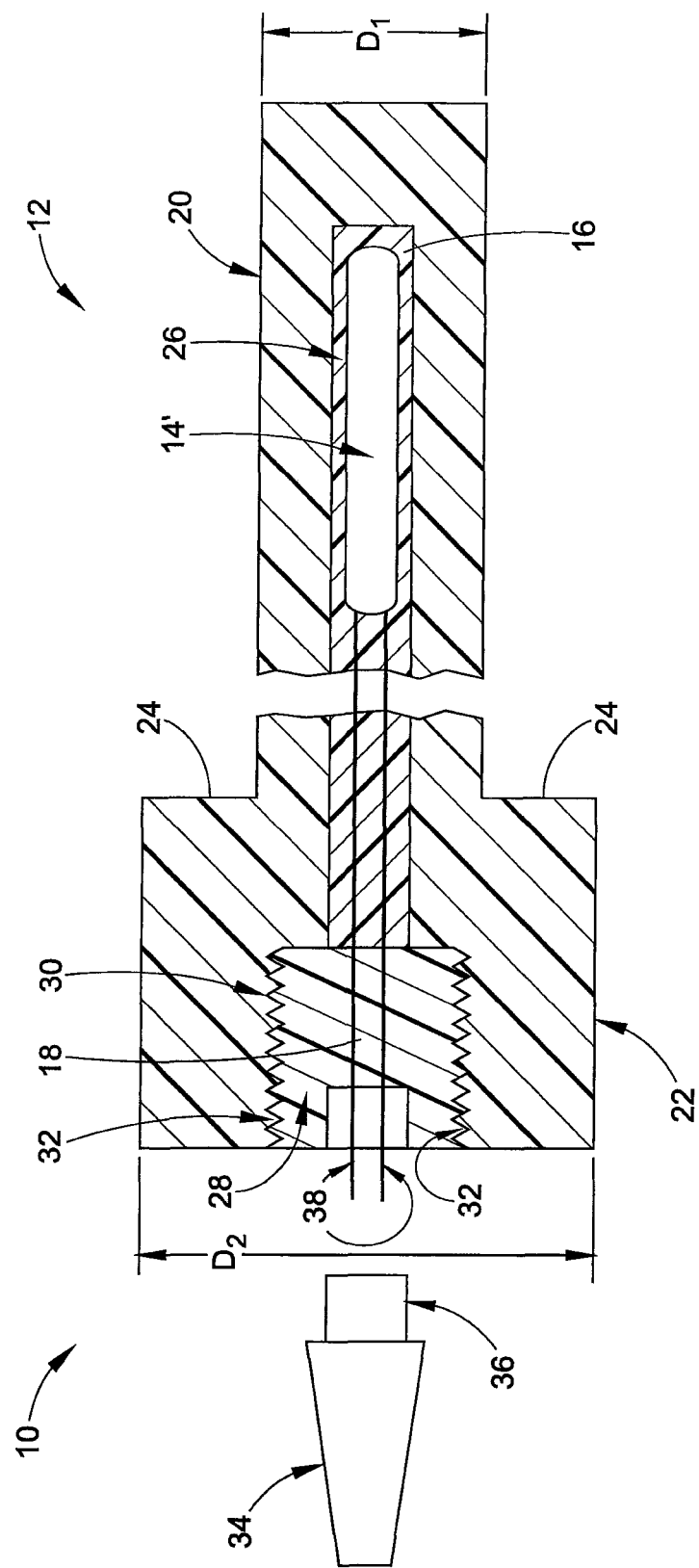
FIG. 5 is a sectional side elevation view of one thermal well implementation.

FIGS. 2-5 show the thermal sensor 14 inserted into a portion of the internal cavity 26. In one example, as shown in FIGS. 2-4, the thermal sensor 14 can be a thermocouple, such as a K type thermocouple, J type thermocouple, etc. In another example, as shown in FIG. 5, a thermal switch sensor 14' can be used. In a further example, the thermal sensor 14 can be an RTD (not shown). It will be appreciated that the thermal sensor 14 can be any suitable thermal sensor for monitoring the temperature of the transformer apparatus 1, and can provide a signal suitable for inhibiting operation of a host system by a controller (not shown) when the operating temperature exceeds a predefined threshold temperature. The thermal sensor 14 or 14' is at least partially located within the internal cavity 26, and may but need not be installed at or near the bottom of the cavity 26 for repeatable precise location relative to transformer coils of the host transformer apparatus 1. As shown in FIGS. 2-5, the thermal sensor 14 or 14' is disposed entirely within the internal cavity 26. As such, the thermal sensor 14 or 14' including the associated wires or leads 38 has a length of slightly less than 10.5" (with an external length of wires or leads 38 extending outward beyond this length from the apparatus 10). In some embodiments, the voltage potential of thermal sensor 14 in FIG. 2 or 14' in FIG. 5 is usually at or near earth ground potential. For example, the purpose of maintaining a large distance from the tip of thermal sensor 14 or 14' to the end of the low relative dielectric constant structure 12 rod is to reduce the corona inception voltage stress in the air (for example, with a dielectric constant=1.0) below and external to assembly 10 due to electric field gradient stress at the dielectric constant discontinuity. However, it will be appreciated that a portion of the thermal sensor 14 or 14' can be disposed within the end region 28 or external to the low relative dielectric constant structure 12 in various alternate embodiments.

The strain relief member 34 in certain embodiments is configured to engage a portion of the thermal sensor 14 or the leads 38 thereof to prevent or inhibit degradation of the wire leads 38 when the thermal well 10 is installed or removed from a host system 1. For example, the thermal sensor 14 includes one or more wires 38 extending from a portion thereof to carry an analog signal (e.g., RTD or thermocouple) or a binary signal (e.g., thermal switch) to an external controller for evaluation of the transformer temperature. In practice, the wires 38 are operably electrically connected to such an external controller (not shown) using any suitable means. In addition, the wires 38 extend out of the end region 28 and through a portion of the strain relief member 34 such that the strain relief member 34 provides mechanical support for the wires 38. In one example, the threads 36 of the strain relief member 34 are threadedly engaged with the threads 32 of the end region 28. In another example, the strain relief member 34 is attached to the low relative dielectric constant structure 12 with a friction-fit (i.e., in a male-female connection). In this regard, the use of threads 32 advantageously facilitates robust connection of the strain relief member 34 to a Teflon structure 12 which may have a low friction surface. In some examples, a removable sleeve 40 (e.g., a Varglass 240 size #10 sleeve, available from Skycraft Parts and Surplus, Winter Park, Fla., not shown) is inserted into the junction between the internal cavity 26 and the end region 28 to act as a stop therebetween. As shown in FIGS. 3 and 4, the sleeve 40 is inserted through a portion of the strain gauge 36 and into the junction between the internal cavity 26 and the end region 28. In some instances, the sleeve can be removed. Advantageously, the wires 38 are supported by the strain relief 34 to prevent separation of the wires 38 from the thermal sensor 14.

In this embodiment, moreover, the first potting material 16 is inserted into the internal cavity 26 following insertion of the thermal sensor 14, 14'. For example, the first potting material 16 encapsulates at least a portion of the thermal sensor 14 within the internal cavity 26 in the illustrated embodiments. As shown in FIGS. 2-5, the first potting material 16 substantially fills the entire internal cavity 26, thereby completely surrounding the thermal sensor 14 and mitigating or eliminating the existence of any air gaps within the cavity 26 in various embodiments. The first potting material 16 can be either epoxy (dielectric constant 3.5) or silicone gel into non-limiting examples, depending on the dielectric withstand voltage and corona inception voltage required for thermal well assembly 10 when mounted between transformer coil windings. In some embodiments, the first potting material 16 is Sil-Gel 612 A/B (available from Wacker Chemical Corp., Canton, Ohio) that has a low dielectric constant of approximately 2.65. For example, Sil-Gel potting material is preferred for higher voltage thermal well assemblies due to the fact that winding voltage stress divides as the inverse of a material's relative dielectric constant. Thus, potting material with lower dielectric constants closer to that of an air void with dielectric constant=1.0 are preferred. As a result, the voltage that is on the high breakdown strength potting material increases as the voltage that is impressed on the air void with reduced chance of ionization corona discharge breakdown decreases in the air void. It will be appreciated that the first potting material 16 can be a solid or a liquid.

The second potting material 18 in this example is inserted into the end region 28. The second potting material 18 in certain implementations fills at least a portion of the end region 28, and preferably eliminates or mitigates air gaps within the end region of the cavity 26. As shown in FIGS. 2-5, for example the second potting material 18 substantially fills the entire end region 28, thereby sealing the thermal sensor 14 within the internal cavity 26 along with the first potting material 16. The second potting material 18 in certain non-limiting embodiments can be either epoxy or silicone gel. In one example, the second potting material is Hard Epoxy #300/11 (available from Aeromarine Products, Inc., San Diego, Calif.) that has a dielectric constant of approximately 3.5, and the second potting material 18 can be a solid or a liquid. It will also be appreciated that the first and second potting materials 16 and 18 can be the same or different materials in various embodiments. For example, in most transformer design conditions, the electric field is reduced in the end region 28 of the thermal well assembly 10, since the coil electric field is mostly confined in the air duct space between the copper coil windings. A hard epoxy with higher dielectric constant is acceptable to use if desired without fear of corona inception degradation. Advantageously, the first and second potting materials 16 and 18 prevent or inhibit air from entering the internal cavity 26 and the end region 28, thereby reducing the likelihood of arcing or corona formation within the thermal well 10.

Figure 6:
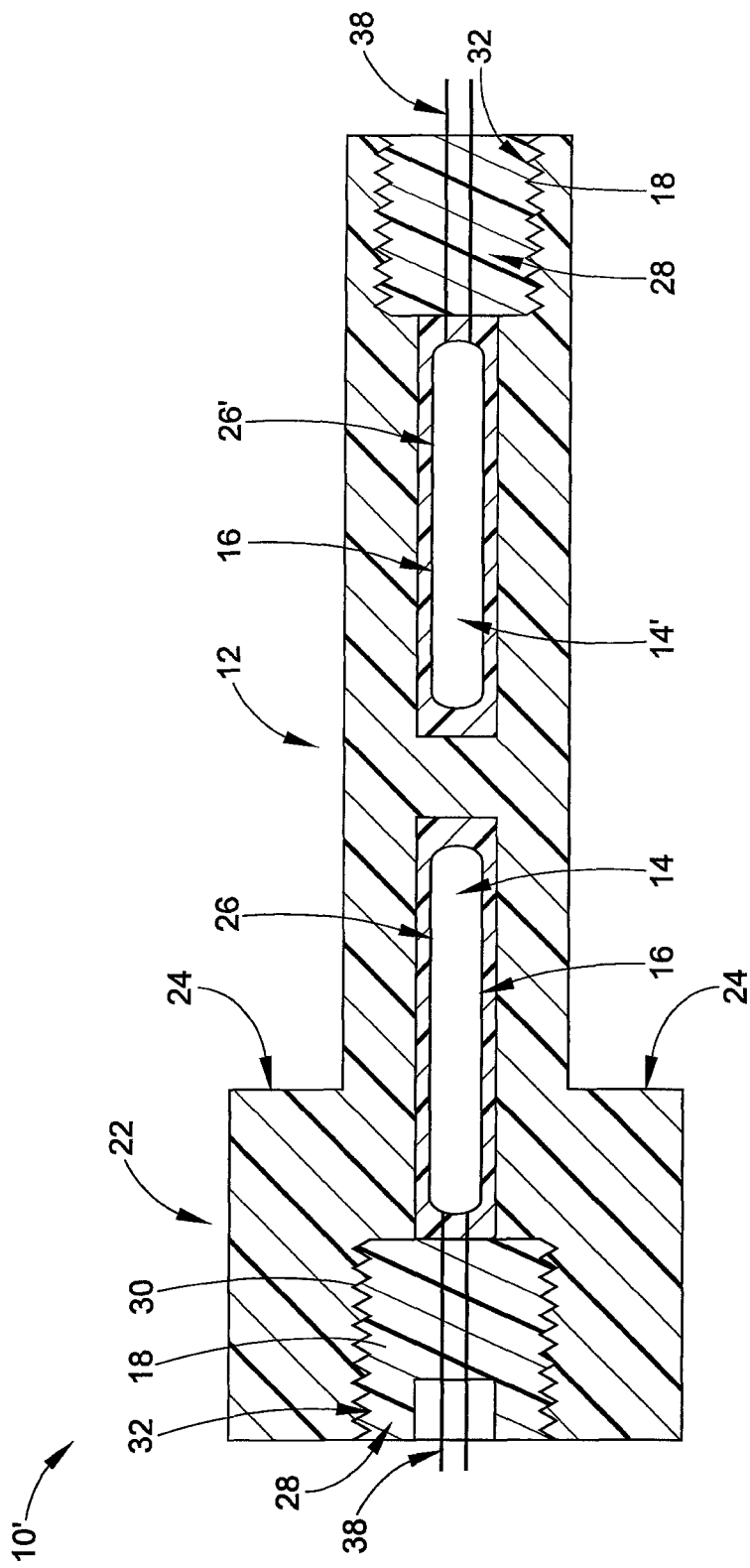
FIG. 6 is a sectional side elevation view of the thermal well implemented with dual temperature sensors.

FIG. 6 shows another alternative embodiment of the thermal well 10'. The thermal well 10' is configured substantially identical to the thermal well 10, except as described below. In this embodiment, the low relative dielectric constant structure 12 includes a second internal cavity 26' with a second end region 28' extending therefrom. A second thermal sensor 14' can be inserted into the second internal cavity 26'. In some examples, the thermal well 10' can accommodate two different thermal sensors 14 (i.e., a thermocouple) and 14' (i.e., a thermal switch) or two identical thermal sensors 14 and 14' (e.g., two thermocouples, two thermal switches, two RTDs, and the like). In addition, the first and second internal cavities 26 and 26' can have different sizes and dimensions to accommodate two different thermal switches (e.g., a thermocouple 14 in the first internal cavity 26 and a thermal switch 14' in the second internal cavity 26'), or the cavities 20, 26' can be similarly dimensioned in other embodiments.

Figure 7:
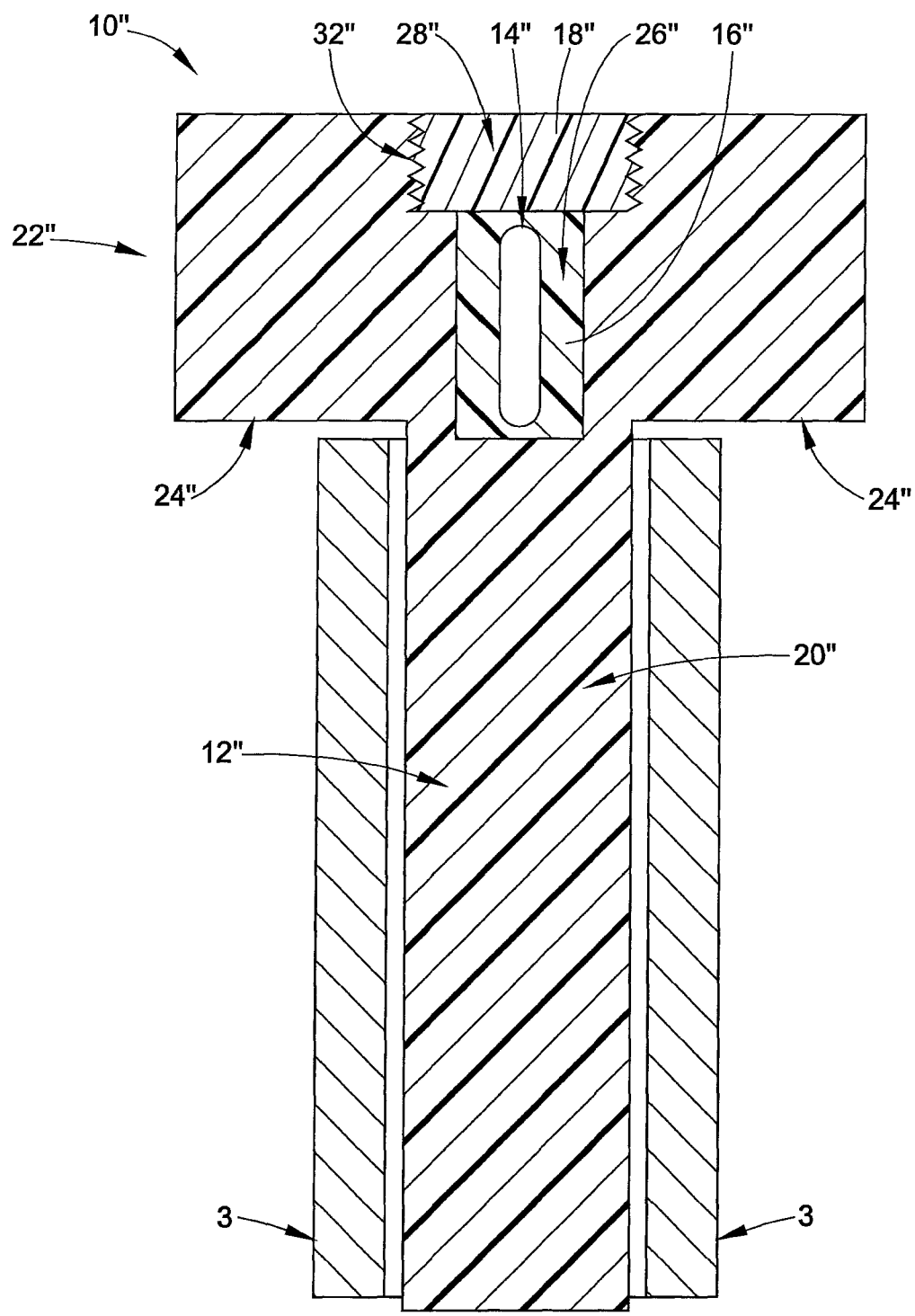
FIG. 7 is a sectional side elevation view of an alternate thermal well implementation mounted between transformer coil wings.

FIG. 7 shows a further alternative embodiment of a thermal well 10". In this embodiment, the thermal well 10" includes a thermally conductive structure 12", a thermal switch 14", a low relative dielectric constant potting material 16", and a thermally insulating shroud 18". Similar to the low relative dielectric constant structure 12 described above, the thermally conductive structure 12" in FIG. 7 includes a first portion 20" with a first outer dimension D1' and a second portion 22" with a second outer dimension D2" that is greater than the first outer dimension D1". The first portion 20" is adapted to fit between two or more transformer coils (i.e., the primary and secondary induction coils 3 and 4). The second portion 22" includes one or more abutment surfaces 24" that rest on a portion of the coils 3 and 4 when installed, thereby allowing the thermally conductive structure 12" to be securely positioned therebetween. The second portion 22" also includes at least one internal cavity 26" for accommodating at least one thermal sensor 14 or 14'. It will be appreciated that the internal cavity 26" can additionally extend into a portion of the first portion 20". The internal cavity 26" includes an end region 28" with threads 32" for engagement with the strain relief member 34. A thermal sensor 14 or 14' (e.g., a thermocouple, a thermal switch, a resistive temperature device, and the like). The thermal sensor 14 or 14' includes wires 38" extending out of the end region 28". The potting material 16" is inserted into the internal cavity 26 "to encapsulate at least a portion of the thermal sensor 14 or 14' within the internal cavity 26". The potting material 16" substantially fills the entire internal cavity 26", thereby completely surrounding the thermal sensor 14 or 14".

The thermally conductive structure 12" in this embodiment is made from a thermally conductive material (i.e., Glastic, CoolPoly D5506 Liquid Crystalline Polymer, Cool-Poly D5108 Liquid Crystalline Polymer, and the like) to transfer heat generated by the coils 3 and 4 from the first portion 20" to the second portion 22". This allows heat to be drawn away from the coils 3, 4 and transfers the heat to the location of the thermal sensor 14 in this case.

The thermal well 10" also includes a thermally insulating shroud 18" that surrounds at least a portion of the second portion 22". The shroud 18" allows for egress of the wires 38" out of the end region 28". The shroud 18" is configured to insulate heat loss to a local ambient (not shown) by any know method (e.g., convection, radiation, and the like).

Figure 8:
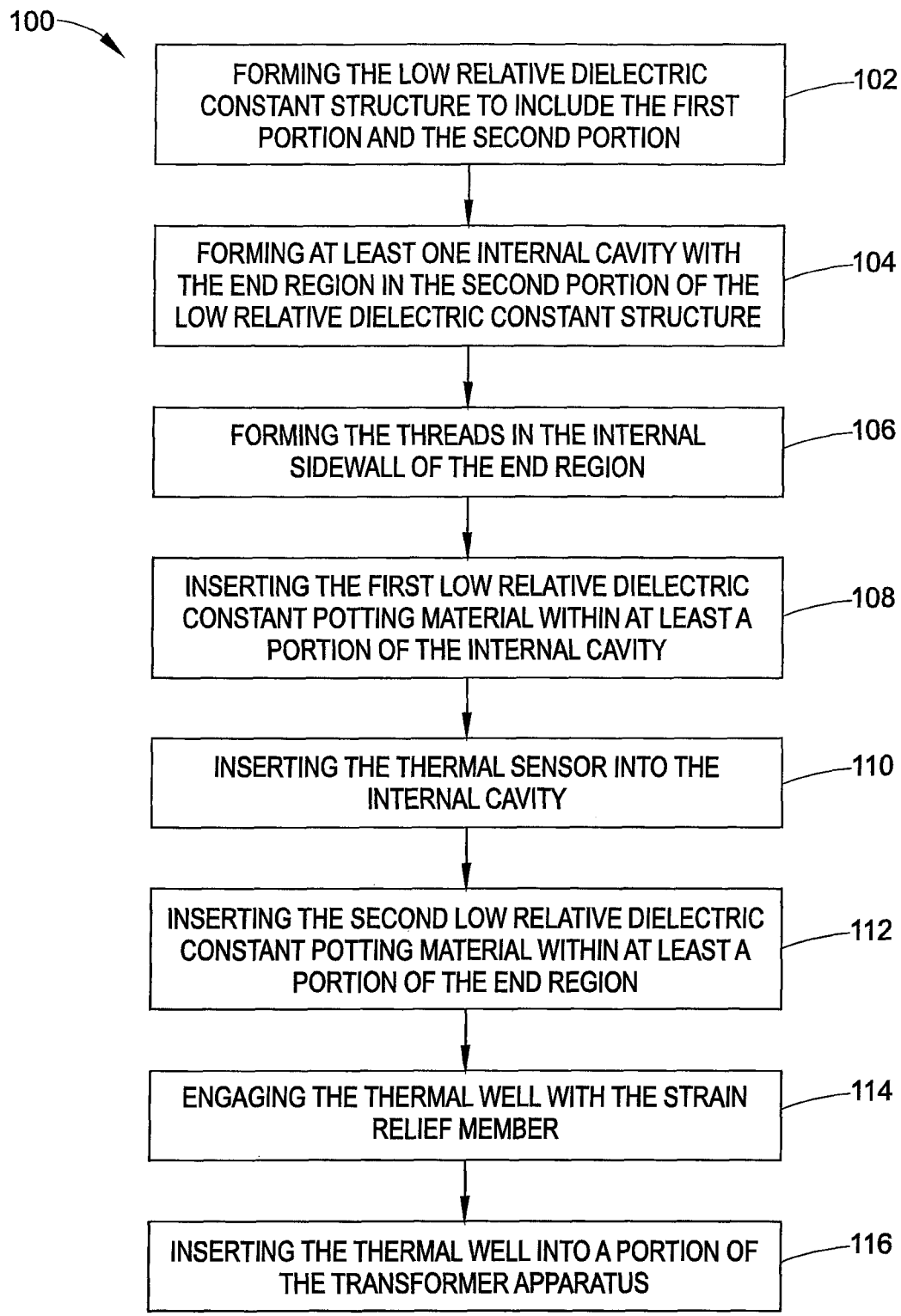
FIG. 8 is a flow diagram of the thermal well assembly.

Referring now to FIG. 8 an example process or method 100 is described for making a thermal well, such as the thermal well 10 described above. Although the method 100 is described in terms of the thermal well 10, it will be appreciated that the method 100 can be used to make the thermal well 10' or the thermal well 10" or other thermal wells (not shown). The method 100 includes forming a low relative dielectric constant structure 12 to include the first portion 20 and the second portion 22 (e.g., Step 102), as well as forming at least one internal cavity 26 within the end region 28 in the second portion 22 of the low relative dielectric constant structure 12 (Step 104). The method 100 further includes forming the threads 32 in the internal sidewall 30 of the end region 28 (e.g., Step 106), inserting the first low relative dielectric constant potting material 16 within at least a portion of the internal cavity 26 (e.g., Step 108) and inserting the thermal sensor 14 into the internal cavity 26 (e.g., Step 110). In addition, the method 100 includes inserting the second low relative dielectric constant potting material 18 within at least a portion of the end region 28 (e.g., Step 112), as well as engaging the thermal well 10 with the strain relief member 34 (e.g., Step 114) and inserting the thermal well 10 into a portion of the transformer apparatus 1 (e.g., Step 116).

At Step 102, the low relative dielectric constant structure 12 is formed, in one embodiment to include a first portion 20 and a second portion 22, thereby providing the above-described abutment surface(s) 24. The low relative dielectric constant structure 12 can be formed by molding or machining (or any other suitable method). For example, a single piece rectangular structure 12 can be formed by molding in certain embodiments, or a single piece structure 12 can be formed by machining, for example a cylindrical outer shape. In another non-limiting example, the low relative dielectric constant structure 12 can have separate first and second portions 20 and 22 that are attached together in any suitable manner (e.g., welding, adhesives, mechanical fasteners, and the like). In another example, undesired portions of the low relative dielectric constant structure 12 can be removed in any suitable manner (e.g., sanding, cutting, and the like) to provide the low relative dielectric constant structure 12 with a substantially T-shaped configuration or other suitable shape, for example, including one or more abutment surfaces 24. The first and second portions 20 and 22 are formed in one example at 102 in FIG. 8 so that the first portion 20 has a first outer dimension $D_1$ and the second portion 22 has a second outer dimension $D_2$ that is greater than the first outer dimension $D_1$ (e.g., FIGS. 2 and 3 above). Upon formation of the first and second portions 20 and 22, the abutment surfaces 24 are consequently formed on the second portion 22 in the illustrated embodiments. In one example, the abutment surfaces 24 extend at least partially outwardly from the second portion 22.

At Step 104 in FIG. 8, at least one internal cavity 26 with the end region 28 is formed in the second portion 22. The internal cavity 26 can be formed in any suitable manner (e.g., drilling, cutting, sand-blasting, molding, machining, and the like). The internal cavity 26 is sized and dimensioned during formation at 104 so as to receive the thermal switch 14, the first potting material 16, and the second potting material 18. The internal cavity 26, moreover, is formed at 104 to extend through the second portion 22 and into the first portion 20 thereof. However, it will be appreciated that the internal cavity 26 can extend into only the second portion 22 in other embodiments, or through the entire first portion 20. In some examples, the internal cavity 26 is centered on the low relative dielectric constant structure 12 during formation at 104, thereby advantageously reducing voltage stress levels on an installed sensor 14, 14'. In other examples, the formed internal cavity 26 can be off-centered on the low relative dielectric constant structure 12. In some instances, the interior dimensions of the end region 28 can be formed at 104 so as to be larger than the internal cavity 26.

At 106 in FIG. 8, threads 32 are optionally formed in the internal sidewall 30 of the end region 28. The threads 32, if used, can be formed in any suitable manner (e.g., tapping, and the like). In some examples, the threads 32 are disposed on only a portion of the end region 28. In other examples, the threads 32 are disposed on the entire length of the end region 28. It will be appreciated that the threads 32 can be formed in any other suitable location within the end region 28 (e.g., on a bottom surface, on another sidewall, and the like), or that the threads 32 can be formed on any suitable portion of the low relative dielectric constant structure 12 to engage any included strain relief member 34.

At Step 108, the first low relative dielectric constant potting material 16 is inserted within at least a portion of the internal cavity 26. The first potting material 16 can be inserted by any suitable method (e.g., pouring, packing, applied with a caulk-like gun, delivered with a balloon-type device, and the like). The first potting material 16 is a liquid which is cured after the thermal sensor 14 is inserted into the internal cavity 26. In some examples, a portion of the internal cavity 26 is filled with the first potting material 16 before insertion of the thermal sensor 14 (e.g., at 110 in FIG. 6). In other examples, the entire internal cavity 26 is substantially filled with first potting material 16 for the thermal sensor 14 is installed. In other possible implementations, the thermal sensor 14 is inserted into the cavity 26 before insertion of the first potting material. It will be appreciated that the internal cavity 26 is substantially entirely filled in certain advantageous implementations with the first potting material 16 so that the thermal switch, thermocouple, RTD 14 is encapsulated thereby while mitigating or avoiding any air gaps within the cavity 26. In some instances, the first potting material 16 is only disposed within the internal cavity 26. However, it will be appreciated that the first potting material 16 can be disposed within all or at least a portion of the end region 28 as well and other embodiments. The first potting material 16 inserted at 108 can be either epoxy or silicone gel into non-limiting examples. In one example, the first potting material 16 is Sil-Gel 612 A/B that has a dielectric constant of approximately 2.65. In this example, parts A and B of a Sil-Gel 612 product (available from Wacker Chemical Corp., Canton, Ohio) are mixed together and inserted into the cavity 26 at 108 to provide the first potting material 16.

At 110 in FIG. 8, the thermal sensor 14 is inserted into the internal cavity 26. In some examples, the thermal sensor 14 is entirely disposed within the internal cavity 26, with one or more lead wires 38 thereof extending outward of the thermal well cavity 26. In other examples, the thermal sensor 14 is disposed in portions of both the internal cavity 26 and the end region 28. In further examples, a portion of the thermal sensor 14 extends out of the thermal well 10 from the end region 28. The thermal sensor 14 in certain implementations is inserted at 110 into the internal cavity 26 until it reaches a bottom of the internal cavity 26 so as to provide repeatable location of the sensor 14 with respect to outlying transformer coils in use in a host system 1. The thermal sensor 14 can be wrapped in an insulator (e.g., Teflon tape, etc.). Excess first potting material 16 spills out of the internal cavity 26 during insertion of the thermal sensor 14 therein at 110 in certain implementations. At 110, moreover, the first potting material 16 may be cured and cooled in certain embodiments. The sensor wires 38 extend out of the internal cavity 26 for later connection with a controller (not shown) of the transformer apparatus 1 or other host system. After the thermal sensor 14 is inserted first potting material 16 is poured into the internal cavity 26, air voids and bubbles therein are eliminated through a vacuum process.

At 112 in FIG. 8, the second low relative dielectric constant potting material 18 is inserted within at least a portion of the end region 28. The second potting material 18 can be inserted by any suitable method at 112 (e.g., pouring, packing, applied with a caulk-like gun, delivered with a balloon-type device, and the like). The second potting material 18 in one embodiment is a liquid; however, the material 18 can be a solid in other implementations. In some examples, a portion of the end region 28 is filled with the second potting material 18. In other examples, the entire end region 28 is substantially filled with second potting material 18. Preferably, the end region 28 is filled with the second potting material 18 so that the internal cavity 26 is sealed. In some instances, the second potting material 18 is only disposed within the end region 28, although the second potting material 18 can be disposed within the internal cavity 26 in other embodiments. To non-limiting examples of suitable second potting material 18 include epoxy and silicone gel. In one example, the second potting material is Aeromarine Epoxy #300/11 with a dielectric constant of approximately 3.5, where Hard Epoxy #300/11 (e.g., available from Aeromarine Products, Inc., San Diego, Calif.) are mixed together to provide the second potting material 18. In other examples, the sleeve 40 is inserted into the junction between the internal cavity 26 and the end region 28 to act as a stop therebetween. The second potting material 18 is then poured into the end region 28. The sleeve 40 may then be removed. The thermal well 10 can be left to cure. It will also be appreciated that the first and second potting materials 16 and 18 can be the same or different materials in various embodiments.

At 114 in FIG. 8, the thermal well 10 is optionally engaged with any included strain relief member 34. In one example, the strain relief member 34 includes threads 36 that are complementary to the threads 32 of the thermal well 10, and the strain relief member 34 is threadedly engaged with the thermal well 10 at the end region 28 of the low relative dielectric constant structure 12 at 114. In another example, the strain relief member 34 is attached to the low relative dielectric constant structure 12 at 114 via a friction-fit (e.g., in a male-female connection). Prior to engagement of the strain relief member 34 and the thermal well 10, the wires 38 of the thermal sensor 14 are fed through a channel (not shown) of the strain relief member 34, thereby preventing separation of the wires 38 from the thermal sensor and providing mechanical support for the wires 38.

At 116, the thermal well 10 is inserted into a portion of the transformer apparatus 1. In one example, the thermal well 10 is rectangular, and inserted into a rectangular opening on the transformer apparatus 1, for example, between adjacent primary windings 3 or between adjacent secondary windings 4. However, it will be appreciated that the thermal well 10 (and the corresponding opening in a given host system) can have any shape. In use, moreover, the thermal well 10 can be positioned in any suitable position on the transformer apparatus 1 or other host system (e.g., proximate a primary coil 3, proximate a secondary coil 4, proximate the core structure 2, etc.).

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A thermal well, comprising:
   a continuous low relative dielectric constant structure having a dielectric constant of greater than 1 or 2.1 or less with an internal cavity extending along a longitudinal direction from a first end to an opening at a second end, the internal cavity including a first region proximate the first end, and a second region extending longitudinally outward from the first region to the opening;
   a thermal sensor at least partially located within the internal cavity and having one or more wires extending out of the opening at the second end of the internal cavity;
   a first low relative dielectric constant potting material having a dielectric constant of greater than 1 or 3.5 or less encapsulating at least a portion of the thermal sensor and at least a major portion of a length of the one or more wires within the cavity; and
   a second low relative dielectric constant potting material having a dielectric constant of greater than 1 or 3.5 or less filling at least a portion of the second region of the internal cavity;
   wherein the first low relative dielectric constant potting material and the second low relative dielectric constant potting material abut each other within the internal cavity;
   wherein the first region of the internal cavity has a first uniform cross-sectional width along its length, the second region of the internal cavity has a second cross-sectional width greater than the first width, and wherein an interface between the first low relative dielectric constant potting material and the second low relative dielectric constant potting material is aligned with a transition between the first width and the second width such that at least a portion of an axial end face of the second low relative dielectric constant potting material abuts the continuous low relative dielectric constant structure.

2. The thermal well of claim 1, wherein the thermal sensor is one of a thermocouple, a thermal switch, and a resistance temperature device.

3. The thermal well of claim 1, wherein the second region of the internal cavity of the low relative dielectric constant structure includes threads formed in an internal sidewall of at least a portion of the second region.

4. The thermal well of claim 3, further including a strain relief member for supporting the one or more wires of the thermal sensor, the strain relief member including threads for engaging the threads of the second region of the internal cavity.

5. The thermal well of claim 1, wherein the low relative dielectric constant structure comprises polytetrafluoroethylene.

6. The thermal well of claim 1, wherein the first low relative dielectric constant potting material is selected from at least one of epoxy and silicone gel.

7. The thermal well of claim 1, wherein the second low relative dielectric constant potting material is selected from at least one of epoxy and silicone gel.

8. The thermal well of claim 1, wherein the thermal sensor is disposed entirely within the internal cavity.

9. The thermal well of claim 1, wherein the internal cavity includes:
a first internal cavity extending along the longitudinal direction from a first end to a first opening at a second end, the first internal cavity including a first region proximate the first end, and a second region extending longitudinally outward from the first region to the first opening;
a second internal cavity extending along the longitudinal direction from a third end to a second opening at a third end, the second internal cavity including a third region proximate the first end, and a fourth region extending longitudinally outward from the third region to the second opening;
wherein the first and second internal cavities are each configured to receive a thermal sensor.

10. The thermal well of claim 1, wherein the low relative dielectric constant structure includes:
a first portion having a first outer dimension;
a second portion proximate the first portion, the second portion including at least one abutment surface extending outwardly therefrom and having a second outer dimension that is greater than the first outer dimension.

11. The thermal well of claim 10, wherein the internal cavity is centered on the first and second portions of the low relative dielectric constant structure relative to outer surfaces thereof.

12. The thermal well of claim 1, wherein the first low relative dielectric constant potting material substantially fills the entire first region of the internal cavity.

13. The thermal well of claim 12, wherein the second low relative dielectric constant potting material substantially fills the entire second region of the internal cavity whereby the first and second low relative dielectric constant potting materials extend longitudinally along distinct portions of the internal cavity.

14. A method of making a thermal well, the method comprising:
forming at least one internal cavity in a low relative dielectric constant structure having a dielectric constant of greater than 1 or 2.1 or less, the internal cavity extending along a longitudinal direction from a first end to a first opening at a second end, the internal cavity including a first region proximate the first end, and a second region extending longitudinally outward from the first region to the first opening;
inserting a first low relative dielectric constant potting material having a dielectric constant of greater than 1 or 3.5 or less within at least a portion of the first region of the internal cavity;
inserting a thermal sensor into the internal cavity with a plurality of sensor wires extending outside of the internal cavity; and
inserting a second low relative dielectric constant potting material having a dielectric constant of greater than 1 or 3.5 or less within at least a portion of the second region of the internal cavity;
wherein the first low relative dielectric constant potting material and the second low relative dielectric constant potting material abut each other within the internal cavity;
wherein the first low relative dielectric constant potting material encapsulates at least a portion of the thermal sensor and at least a major portion of a length of the one or more wires within the cavity;
wherein the first region of the internal cavity has a first uniform cross-sectional width along its length, the second region of the internal cavity has a second cross-sectional width greater than the first width, and wherein an interface between the first low relative dielectric constant potting material and the second low relative dielectric constant potting material is aligned with a transition between the first width and the second width such that at least a portion of an axial end face of the second low relative dielectric constant potting material abuts the continuous low relative dielectric constant structure.

15. The method of claim 14, further including:
forming threads in an internal sidewall of at least a portion of the second region of the internal cavity.

16. The method of claim 15, further including:
engaging threads of a strain relief member with the threads of the second region of the internal cavity, the strain relief member supporting the one or more wires of the thermal sensor.

17. The method of claim 14, further including:
forming the low relative dielectric constant structure to include:
a first portion having a first outer dimension, and a second portion proximate the first portion, the second portion including at least one abutment surface extending outwardly therefrom and having a second outer dimension that is greater than the first outer dimension.

18. The method of claim 17, wherein forming at least one internal cavity in a low relative dielectric constant structure further includes:
centering each internal cavity on the first and second portions of the low relative dielectric constant structure.

19. The method of claim 14, wherein:
inserting a first low relative dielectric constant potting material within at least a portion of the first region further includes substantially filling the entire first region of the internal cavity with the first low relative dielectric constant potting material; and
wherein inserting a second low relative dielectric constant potting material within at least a portion of the second region further includes substantially filling the entire second region with the second low relative dielectric constant potting material.

20. A transformer apparatus, comprising:
at least one primary coil wound at least partially around a core structure;
at least one secondary coil wound at least partially around the core structure; and
at least one thermal well positioned proximate one of the at least one primary coil and the at least one secondary coil, the at least one thermal well comprising:
a low relative dielectric constant structure with at least one internal cavity, the at least one internal cavity extending along a longitudinal direction from a first end to a first opening at a second end, the first internal cavity including a first region proximate the first end, and a second region extending longitudinally outward from the first region to the first opening;

a thermal sensor at least partially located within the internal cavity and having one or more wires extending out of the first opening at the second end of the internal cavity;

a first low relative dielectric constant potting material having a dielectric constant of greater than 1 or 3.5 or less encapsulating at least a portion of the thermal sensor within the at least a portion of the first region of the internal cavity; and a second low relative dielectric constant potting material having a dielectric constant of greater than 1 or 3.5 or less filling at least a portion of the second region of the internal cavity;

wherein the first low relative dielectric constant potting material and the second low relative dielectric constant potting material abut each other within the internal cavity;

wherein the first low relative dielectric constant potting material encapsulates at least a portion of the thermal sensor and at least a major portion of a length of the one or more wires within the cavity;

wherein the first region of the internal cavity has a first uniform cross-sectional width along its length, the second region of the internal cavity has a second cross-sectional width greater than the first width, and wherein an interface between the first low relative dielectric constant potting material and the second low relative dielectric constant potting material is aligned with a transition between the first width and the second width such that at least a portion of an axial end face of the second low relative dielectric constant potting material abuts the continuous low relative dielectric constant structure.

* * * * *